(12) United States Patent
Ponjou Tasse et al.

(10) Patent No.: US 12,093,310 B2
(45) Date of Patent: Sep. 17, 2024

(54) MULTI-MODAL IMAGE SEARCH

(71) Applicant: SELERIO LIMITED, London (GB)

(72) Inventors: Flora Ponjou Tasse, London (GB); Ghislain Fouodji Tasse, London (GB)

(73) Assignee: STREEM, LLC, Portland, OR (US)

( * ) Notice: Subject to any disclaimer, the term of this patent is extended or adjusted under 35 U.S.C. 154(b) by 59 days.

(21) Appl. No.: 16/492,062

(22) PCT Filed: Mar. 7, 2018

(86) PCT No.: PCT/GB2018/050574
§ 371 (c)(1),
(2) Date: Sep. 6, 2019

(87) PCT Pub. No.: WO2018/162896
PCT Pub. Date: Sep. 13, 2018

(65) Prior Publication Data
US 2020/0104318 A1 Apr. 2, 2020

(30) Foreign Application Priority Data

Mar. 7, 2017 (GB) ..................................... 1703602

(51) Int. Cl.
*G06F 16/58* (2019.01)
*G06F 16/53* (2019.01)

(52) U.S. Cl.
CPC .......... *G06F 16/5866* (2019.01); *G06F 16/53* (2019.01)

(58) Field of Classification Search
CPC ...... G06F 16/5866; G06F 16/53; G06F 16/43; G06F 16/48
See application file for complete search history.

(56) References Cited

U.S. PATENT DOCUMENTS

| 6,993,535 | B2 | 1/2006 | Bolle et al. |
| 9,436,895 | B1 | 9/2016 | Jones et al. |
| 9,792,492 | B2 * | 10/2017 | Soldevila ............... G06V 10/76 |
| 10,685,057 | B1 * | 6/2020 | Chavez ............... G06F 16/9535 |

(Continued)

FOREIGN PATENT DOCUMENTS

| JP | 5121872 | 1/2013 |
| WO | WO 2015/173647 | 11/2015 |

OTHER PUBLICATIONS

Multi-view Convolutional Neural Networks for 3D Shape Recognition, Hang Su et al., Sep. 27, 2015.*

(Continued)

*Primary Examiner* — Richard L Bowen
*Assistant Examiner* — Aryan D Toughiry
(74) *Attorney, Agent, or Firm* — Schwabe Williamson & Wyatt

(57) ABSTRACT

The present invention relates to methods for searching for two-dimensional or three-dimensional objects. More particularly, the present invention relates to searching for two-dimensional or three-dimensional objects in a collection by using a multi-modal query of image and/or tag data. Aspects and/or embodiments seek to provide a method of searching for digital objects using any combination of images, three-dimensional shapes and text by embedding the vector representations for these multiple modes in the same space. Aspects and/or embodiments can be easily extensible to any other type of modality, making it more general.

16 Claims, 7 Drawing Sheets

(56) References Cited

U.S. PATENT DOCUMENTS

| | | | | |
|---|---|---|---|---|
| 2003/0004966 | A1* | 1/2003 | Bolle | G06F 16/685 |
| | | | | 707/E17.103 |
| 2013/0290222 | A1 | 10/2013 | Gordo et al. | |
| 2014/0280101 | A1 | 9/2014 | Stipins, III | |
| 2015/0120760 | A1 | 4/2015 | Wang et al. | |
| 2015/0278642 | A1 | 10/2015 | Chertok et al. | |
| 2016/0350336 | A1* | 12/2016 | Checka | G06F 16/5866 |
| 2017/0221243 | A1* | 8/2017 | Bedi | G06T 11/60 |
| 2017/0337690 | A1* | 11/2017 | Arth | G06T 7/10 |

OTHER PUBLICATIONS

International Preliminary Report on Patentability from PCT/GB2018/050574 mailed Sep. 10, 2019, 11 pgs.
Examination Report from EP Application No. EP18711633.0 dated Jul. 13, 2021, 12 pgs.

* cited by examiner

MULTI-MODAL IMAGE SEARCH

CROSS-REFERENCE TO RELATED APPLICATION

This patent application is a U.S. National Phase Application under 35 U.S.C. § 371 of International Application No. PCT/GB2018/050574, filed Mar. 7, 2018, entitled "MULTI-MODAL IMAGE SEARCH," which claims the benefit of British Application No. 1703602.1, filed on Mar. 7, 2017, entitled "MULTI-MODAL IMAGE SEARCH," the entire contents of which are hereby incorporated by reference herein.

FIELD

The present invention relates to methods for searching for two-dimensional or three-dimensional objects. More particularly, the present invention relates to searching for two-dimensional or three-dimensional objects in a collection by using a multi-modal query of image and/or tag data.

BACKGROUND

The Internet now contains a very significant amount of image data, with a 2014 report indicating that approximately 657 billion images are made available over the internet per year. Images are often catalogued by repositories such as Google Images in order to allow users to locate relevant images.

Following the more recent reduction in hardware prices for three-dimensional data acquisition devices such as depth sensors that enable more users to purchase such hardware and start generating three-dimensional models with this hardware, and advances in manufacturing processes like three-dimensional printing that require three-dimensional models to work, online three-dimensional model repositories are also experiencing significant growth in the number of models stored.

However, most search features in these repositories remain text-based. At best, repositories such as Google Images accept image queries in order to identify relevant three-dimensional models within the repository for input images. Specifically, current search functionality on three-dimensional and two-dimensional repositories such as Thingiverse or Google Images accept only one form of query from users, an image or a text. Search with images focuses on visual similarity, while text-based focuses on semantic similarity.

Text is the prevalent way of searching information online. This is not surprising since spoken and written text are our main channels of communication. Thus, the earliest efforts in image and three-dimensional model search/retrieval are based on the use of text queries, for example as set out in a publication by Markkula, Marjo, and Eero Sormunen titled "End-user searching challenges indexing practices in the digital newspaper photo archive." As published in Information retrieval 1.4 (2000): 259-285. The problem with searching using text queries is one of retrieving relevant objects from a database, specifically those objects that are most relevant to a given text query. For instance, given the query word "dog", ideally the top retrieved objects should feature dogs. Common search engines for text data, such as Google and Bing, support large text databases by indexing. User-supplied keywords are then matched against an index in the database at query time. Early text-based retrieval systems take advantage of the large body of work in text database indexing by representing each object with a set of user-supplied labels. However, these labels are often missing, inaccurate or incomplete.

Images can be an alternative query form when the user cares about finding visually similar objects. This modality is challenging. Images typically contain multiple objects, that may appear in various poses, and are subject to both occlusions and self-occlusions. Furthermore, these objects vary in texture and appearance depending on illumination settings. Comparing the similarity between two images consists of computing a vector representation of each image description and then estimating the distance between the two descriptors.

In the publication by Sivic, Josef, and Andrew Zisserman entitled "Video google: A text retrieval approach to object matching in videos." as published in iccv. Vol. 2. No. 1470. 2003, an approach was presented that represented images as a set of key local features, referred to as "Bag of visual words". The problem with this type of method is that the features are hand-crafted, based on heuristics such as edge information. A recent trend in image description uses deep learning to automatically learn image descriptors from data, producing significantly better retrieval results, for example as described in a publication by Yue-Hei Ng, Joe, Fan Yang, and Larry S. Davis titled "Exploiting local features from deep networks for image retrieval." and published in Proceedings of the IEEE Conference on Computer Vision and Pattern Recognition Workshops 2015.

Shape retrieval with images is tightly coupled with image retrieval since a three-dimensional shape can be represented by a list of rendered images from different viewpoint. Given a query image, the task is reduced to finding the most relevant rendered views. More recently, a publication by Li, Yangyan, et al. titled "Joint embeddings of shapes and images via CNN image purification." and published in ACM Trans. Graph. 34.6 (2015): 234 proposed a more holistic method that uses deep learning to embeds both images and 3D shapes in one common vector space, making it possible to directly search for 3D shapes using an image.

There is very little work addressing image or object retrieval with multimodal queries that include text, particularly regarding three-dimensional object retrieval.

SUMMARY OF INVENTION

Aspects and/or embodiments seek to provide a method of searching for digital objects using any combination of images, three-dimensional shapes and text by embedding the vector representations for these multiple modes in the same space. Aspects and/or embodiments can be easily extensible to any other type of modality, making it more general.

According to a first aspect, there is provided a method for combining image data and tag data into a unified representation, comprising the steps of: determining a vector representation for the image data in a vector space of words; determining a vector representation for the tag data in the vector space of words; and combining the vector representations by performing vector calculus.

By using a unified representation for multi-modal data, it can be possible to search within one vector space for relevant multi-modal data using other multi-modal data. 3D models may be considered as collections of rendered images, where each image is a rendering from a random viewpoint. Therefore a 3D shape descriptor can comprise a combination of its view descriptors.

Optionally, semantically close words are mapped to spatially close vectors in the vector space of words. The mapping may occur in the word vector space used to embed all other modalities.

Optionally, the vector representations are determined by: determining a vector for each of the image data in the vector space of words; and embedding the image data and tag data in the vector space of words. The vector space of words may also be referred to interchangeably as the word vector space.

Mapping semantically close words to spatially close vectors can allow similar multi-modal data to be associated by proximity, allowing searching by proximity of meaning. Previously used techniques may generate descriptors in a vector space instead and hence capture no semantic information, making it significantly difficult to unify a descriptor from one modality to one from another modality into a result that can be used for search. The arrangement disclosed herein is operable to use semantic information as a link across multiple modalities. Optionally, the step of performing vector calculus comprises determining linear combinations of the vector representations in the vector space of words.

A carefully constructed vector space of words, where similar words map to spatially close vectors, can support this advantageous vector arithmetic property: the semantic information in words can be added or subtracted though vector addition and subtraction. For example, $v_{queen} - v_{woman} + v_{man} \approx v_{king}$. As vector arithmetic in such a space carries semantic values, it is possible to use determined linear combinations of the vector representations to combine multi-modal search queries in one vector to enable searching of multi-modal data in unified vector space.

Optionally, the image data and/or tag data comprises one or more weights. These weights are used to specify the influence of each of one or more query items.

Optionally, the step of determining a vector representation for the image data is performed using a neural network, optionally a convolutional neural network.

The use of neural networks may be referred to as a use of machine learning. Machine learning may further be performed through the use of one or more of: a non-linear hierarchical algorithm; recurrent neural network; long short-term memory network; multi-dimensional convolutional network; a memory network; or a gated recurrent network allows a flexible approach when generating the predicted block of visual data. The use of an algorithm with a memory unit such as a long short-term memory network (LSTM), a memory network or a gated recurrent network can keep the state of the predicted blocks from motion compensation processes performed on the same original input frame. The use of these networks can improve computational efficiency and also improve temporal consistency in the motion compensation process across a number of frames, as the algorithm maintains some sort of state or memory of the changes in motion. This can additionally result in a reduction of error rates.

Optionally, the neural network is generated by an image classifier followed by an image encoder operable to generate embeddings in the vector space of words. Optionally, the classifier is operable to be trained to identify image labels. Optionally, the classifier is converted to an encoder operable to generate semantic-based descriptors. Optionally, the neural network comprises one or more fully-connected layers. Optionally, the one or more fully-connected layers are operable to return a vector of the same dimensionality of the image data.

The classifier can be implemented as a convolutional neural network, and hence provide the advantages disclosed herein. The convolutional layers of, for example, the AlexNet implementation capture progressively more complex edge information, while the pooling layers apply sub-sampling. The fully-connected layers can specify how the information captured from previous layers is combined to compute the probability that an image has a given label.

Optionally, one or more parameters of the one or more fully-connected layers are updated to minimize a total Euclidian loss. Optionally, the total Euclidian loss is calculated through consideration of the smallest Euclidian difference between two points. Optionally, the neural network is operable to minimize the Softmax loss. In this way any errors may be reduced, and hence the accuracy of queries may be increased.

Optionally, there is provided a further step of receiving a query regarding the image data and/or the tag data; and providing a unified representation in relation to the query. The query can provide a way for information to be accessed by a user and/or searching program.

Optionally, a descriptor is calculated in advance of a query being received and/or processed. In this way relevant results may be provided more quickly on receipt of a query.

Optionally, the image data comprises one or more embedded images. Optionally, a descriptor is calculated in relation to each of the one or more embedded images. Optionally, a shape descriptor is calculated according to an average of one or more descriptors in relation to each of the one or more embedded images, optionally wherein the average is biased according to one or more of the weights.

Images and shapes may be embedded in the same word vector space, thus ensuring that all modalities share a common representation. This is extendable to three-dimensional shapes by computing rendered views for a shape from multiple viewpoints and computing a descriptor for each view. The shape descriptor may then comprise an average of its view descriptors.

According to a second aspect, there is provided a method of searching a collection of objects based on visual and semantic similarity of the unified representations of the collection of objects wherein the unified representations are combined using the method of the first aspect, comprising the steps of: determining a unified descriptor for the search query, where the search query comprises both image or object data and word or tag data; determining one or more objects in the collection of objects having a spatially close vector representation to the unified descriptor for the search query.

Searching a collection of objects based on visual and semantic similarity can allow for the retrieval and/or location of three-dimensional objects based on multi-modal search queries using image and/or text data.

Optionally, the unified descriptor or vector representation of a shape is an average of one or more rendered views of the shape. The average may be a weighted average, where the weight of a rendered view is determined by a proportion of the 3D shape information which is captured by that view.

By taking multiple views of an object, it can be more accurately located in a collection of objects as more viewpoints can allow for more efficient or certain identification of similar objects.

According to a third aspect, there is provided a method for searching for an image or shape based on a query comprising tag and image data, comprising the steps of: creating a word space in which images, three dimensional objects, text and combinations of the same are embedded; determining vector representations for each of the images, three dimensional objects, text and combinations of the same; determining a vector representation for the query; determining which one or more of the images, three dimensional objects, text and combinations have a spatially close vector representation to the vector representation for the query.

Searching a collection of objects based on visual and semantic similarity can allow for the location of three-dimensional objects based on multi-modal search queries using image and/or text data.

Optionally, the method further comprises the step of replacing objects in an image with contextually similar objects Should it be required, if an object in an image can be described in for example vector form then a similar object having a similar vector can be exchanged for the original object in the image for various reasons, including to help visualise different objects in a scene. Such an arrangement may be used for augmented reality and/or advertising.

In aspects and/or embodiment, given an image containing an object to be replaced such as a framed picture, and a set of tags describing the scene of the image such as "bar" or "office", the algorithm of some aspects or embodiments can find the most visually and contextually meaningful image for the replacement. This can have several applications such as advertising, where an object in the scene can be replaced with a branded product that is contextually relevant to the scene. Such an advert may be referred to as native in-video advertising.

BRIEF DESCRIPTION OF DRAWINGS

Embodiments will now be described, by way of example only and with reference to the accompanying drawings having like-reference numerals, in which.

SPECIFIC DESCRIPTION

In the publication by Tasse, Flora Ponjou, and Neil Dodgson with the title "Shape2Vec: semantic-based descriptors for 3D shapes, sketches and images" and published in ACM Transactions on Graphics (TOG) 35.6 (2016): 208, a method is presented on shape description that consisted of embedding a set of modalities in a fixed word vector space, thus generating semantic-based descriptors. Shape2Vec captures both visual and semantic features, and is applicable to modalities such as sketches, colour images, 3D shapes and RGB-D images. Results show that retrieval based on this representation outperforms previous mesh-based shape retrieval by a 73% improvement. However, the retrieval applications of Shape2Vec only accepted one modality at a time as query. In embodiments, the method is extended to support multimodal queries, and in particular queries consisting of an image and text.

Referring to FIGS. 1 to 6, an embodiment will now be described.

First, a unified descriptor from a combination of image and text is constructed. This is done by first representing each of the image 10 and text descriptors 20a separately using Shape2Vec, followed by using vector calculus (which can comprise vector analysis and/or multivariable calculus and/or vector arithmetic) to combine the descriptors 20b.

Figure 1:
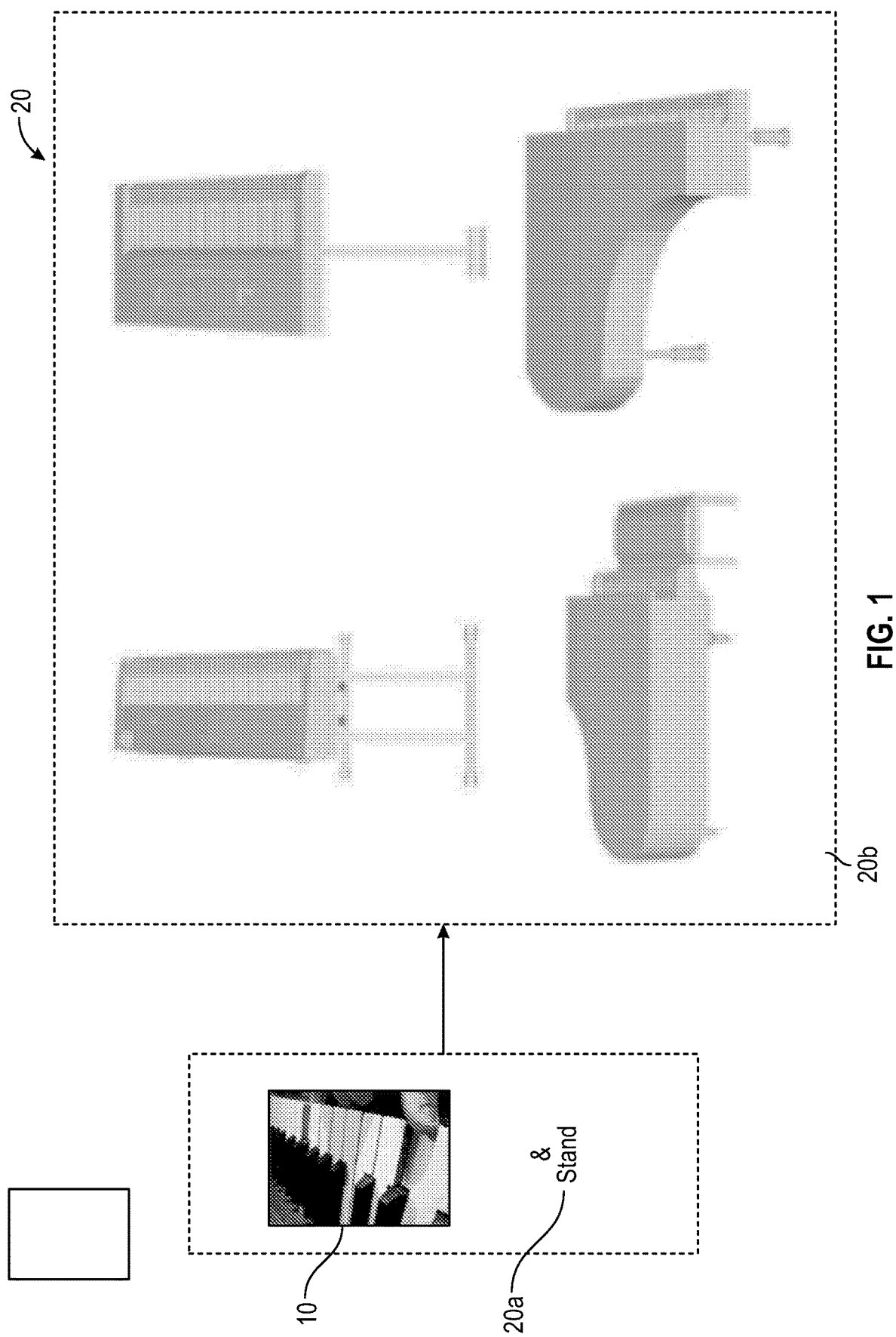
FIG. 1 illustrates an example of a multi-modal query comprising one image and one tag, and the corresponding 3D models retrieved.
Figure 2:
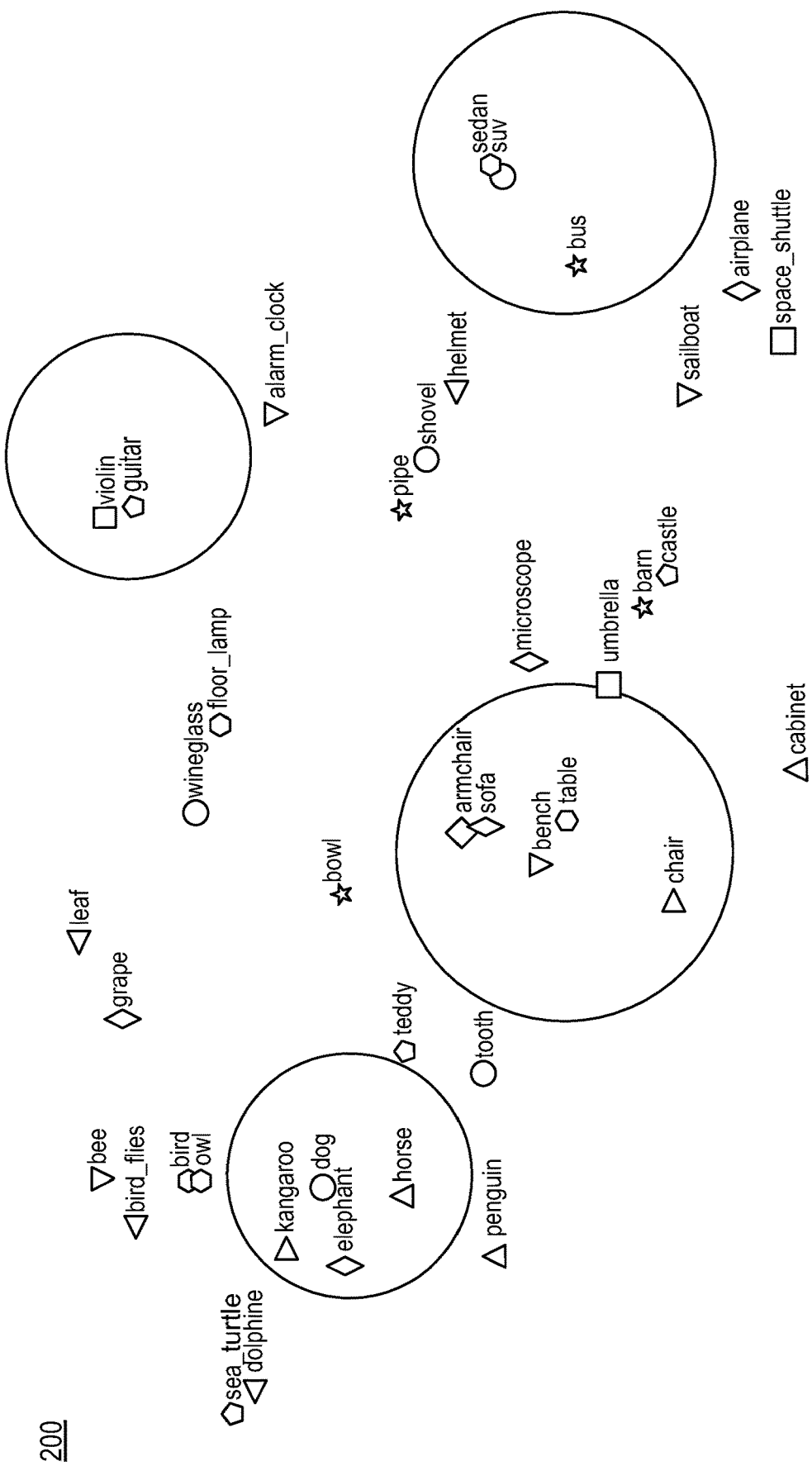
FIG. 2 illustrates an example of vector space showing semantically close words being mapped to spatially close vectors.
Figure 3:
FIG. 3 illustrates an example of vector space showing 3D shape descriptors mapped into the above word vector space, in particular showing semantically close shapes being mapped to spatially close vectors.

In this embodiment, W is a vector space of words 200 that can map text to a vectorial representation. It is assumed that such a vector space already exists, and remains fixed. An example of such a vector space approach is the "word2vec" approach and neural network as presented in Mikolov, Tomas, et al. "Distributed representations of words and phrases and their compositionality" as published in Advances in neural information processing systems 2013. Semantically close words are mapped to spatially close vectors, as illustrated in the FIG. 2. A similar vector space 300 showing 3D shape descriptors mapped into the above word vector space, in particular showing semantically close shapes being mapped to spatially close vectors, is shown in FIG. 3.

The visual-semantic descriptors are computed in two steps: (1) embedding images and shapes in W and then (2) embedding multi-modal input of the image (object) and text in W.

For the first step of computing the visual-semantic descriptors, based on a training dataset, a neural network is trained to map an image (or shape) to a vector that lies in W. This is a similar approach to that taken by Shape2Vec described and referenced above. This process embeds images and shapes in the same word vector space, thus ensuring that all modalities share a common representation.

For the second step of computing the visual-semantic descriptors, in this embodiment W is a vector space where addition and scalar multiplication are defined. Using the properties of a vector space, linear combinations of vectors in W also lie in W. Thus, taking a multimodal input, a descriptor for each modality is computed, and these descriptors are combined into one descriptor using vector arithmetic.

Given the above steps, descriptors can be computed for each object in a collection in advance of queries being received or processed. At query time, a unified descriptor is computed for a multimodal input, and any object with a spatially close descriptor is a relevant result.

For training, a dataset of images (and 3D models) is needed. Let $I=\{(I_i,y_i)\}_{i \in [0,N-1]}$ be a set of N labelled images, and $S=\{(S_i,y_i)\}_{i \in [0,M-1]}$ be a set of M labelled 3D shapes. An example of a set of images/is the ImageNet dataset and an example of S is the Shapenet [10].

The next step is to embed images and shapes in W, specifically to embed an image $I_k$ in W. This is extendable to three-dimensional shapes by computing rendered views for a shape from multiple viewpoints and computing a descriptor for each view. The shape descriptor is then an average of its view descriptors.

Figure 4:
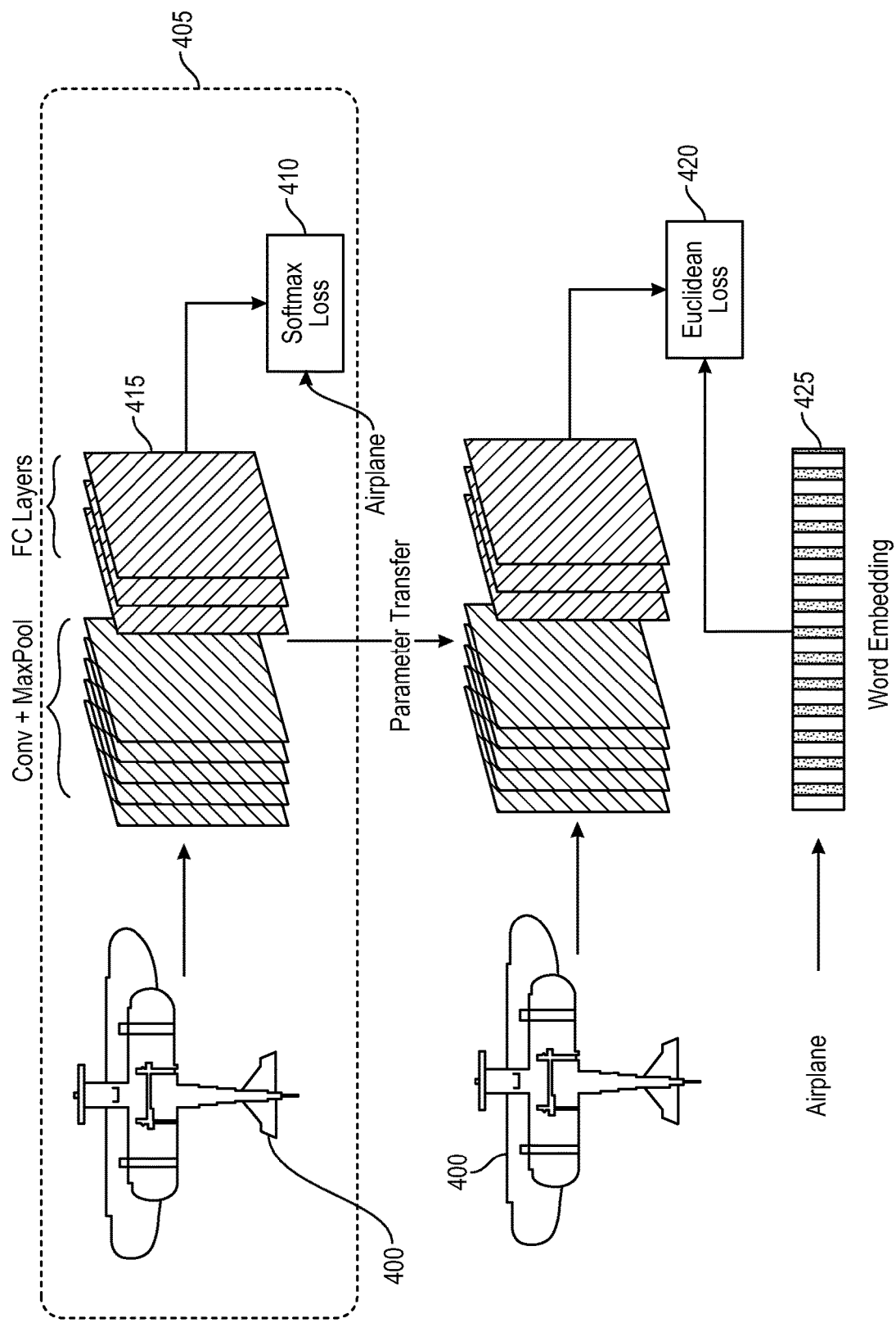
FIG. 4 illustrates an example trained convolutional neural network to embed an image in a vector space of words.

The approach of this embodiment thus trains a convolutional neural network to embed an image in W, using Shape2Vec. This is illustrated in FIG. 4.

To obtain this convolutional network, an image classifier is created, followed by an image encoder operable to generate embeddings in the word vector space. A classifier may be trained to correctly identify image labels. This classifier may then be converted into an encoder and fine-tuned to generated semantic-based descriptors in the next section.

The classifier can be implemented as a convolutional neural network, for example based on the AlexNet implementation set out in a publication by Krizhevsky, Alex, Ilya Sutskever, and Geoffrey E. Hinton titled "Imagenet classification with deep convolutional neural networks" published in Advances in neural information processing systems 2012. The AlexNet implementation is a multi-layer network consisting of one input layer, a combination of five convolutional and pooling layers and three fully-connected layers.

The convolutional layers of the AlexNet implementation capture progressively more complex edge information, while the pooling layers apply subsampling. The fully-connected layers specify how the information captured from previous layers is combined to compute the probability that an image has a given label. These layers are controlled by about 60 million parameters that are initialized with AlexNet and optimised using the training dataset I. The AlexNet architecture can replaced with any other architecture that achieves more accurate performance on classification tasks.

The top half of FIG. 4 illustrates the classifier architecture 405. The optimization goal is to minimize the Softmax loss 410, which captures the performance of the classifier. The Softmax loss 410 for a training sample ($I_i$, $y_i$) is:

$$L_i^s = -\log\left(\frac{e^{f_{y_i}}}{\sum_{j=0}^{K-1} e^{f_j}}\right)$$

where $y_i$ is the correct label, K is the number of classes in the dataset and f is the Softmax function.

$$f_j(z) = \frac{e^{z_j}}{\sum_{k=0}^{K-1} e^{z_k}}$$

where z is the output of the final fully-connected (FC) layers 415 comprising the scores of each class given the image $I_i$ 400.

The total Softmax loss $L^S$ is the mean of individual losses $L_i^S$ over a batch of training input, plus regularisation terms such as L2 regularisation that encourages parameters to be small.

After training the above neural network, a classifier has been developed that can identify image labels. This network can then be modified and its parameters fine-tuned to embed 425 images in W as described below.

Next, an image encoder is trained to output vectors in W. To generate a vector that lies in W, given an image, the classifier is converted into an encoder that returns vectors similar to the vector representation of the image label.

More specifically, the final fully-connected layer now returns a vector of the same dimensionality as W, and given the training sample ($I_i$, $y_i$), the loss is $$L^E_i = \|z_i - W(y_i)\|_2$$

where $W(y_i)$ is the vector representation of the label $y_i$.

To preserve visual features captured by the classifier, only the parameters of the fully-connected layers are updated to minimize to total Euclidean loss 420 $L^E = \Sigma L^E_i$.

Training the modified network produces an encoder E that embed images in W.

Next, the multi-modal input of image/object and text is embedded in W. Given an image $I_{input}$ and a set of tags $\{t_0, \ldots, t_{n-1}\}$, we use the vector arithmetic in the vector space W, to compute a unified descriptor as follows:

$$E(I_{input}, t_0, \ldots, t_{n-1}) = w_v E(I_{input}) + w_s \sum_{j=0}^{n-1} W(t_j)$$

where weights $w_v$ and $w_s$ represents the weights of the image (visual) and tags (semantic) respectively. These weights are used to specify the influence of each of the query items. Although by default they are set to $w_v = w_s = 0.5$, they can be modified to:

1) accommodate user intention (for example, the tags may carry more value than the image), or
2) automatically computed weights that reflect how well the given queries are described in the vector space (for instance the tag "balafon"' is poorly represented during training and thus its descriptor should carry less value).

This may be considered a significant step away from typical descriptor fusion method such as concatenation, where this type of weighting is can present a number of challenges, as well as learning-based fusion methods where weighting has been incorporated into the training process. The disclosure represents a simple and efficient weighting scheme enabled by the semantic information that vector arithmetic carries.

To retrieve the top K objects in a collection based on the multimodal query, the method of this embodiment returns objects or images $I_k$ such that the smallest Euclidean distance between $E(I_k)$ and $E(I_{input}, t_0, \ldots, t_{n-1})$.

Figure 5:
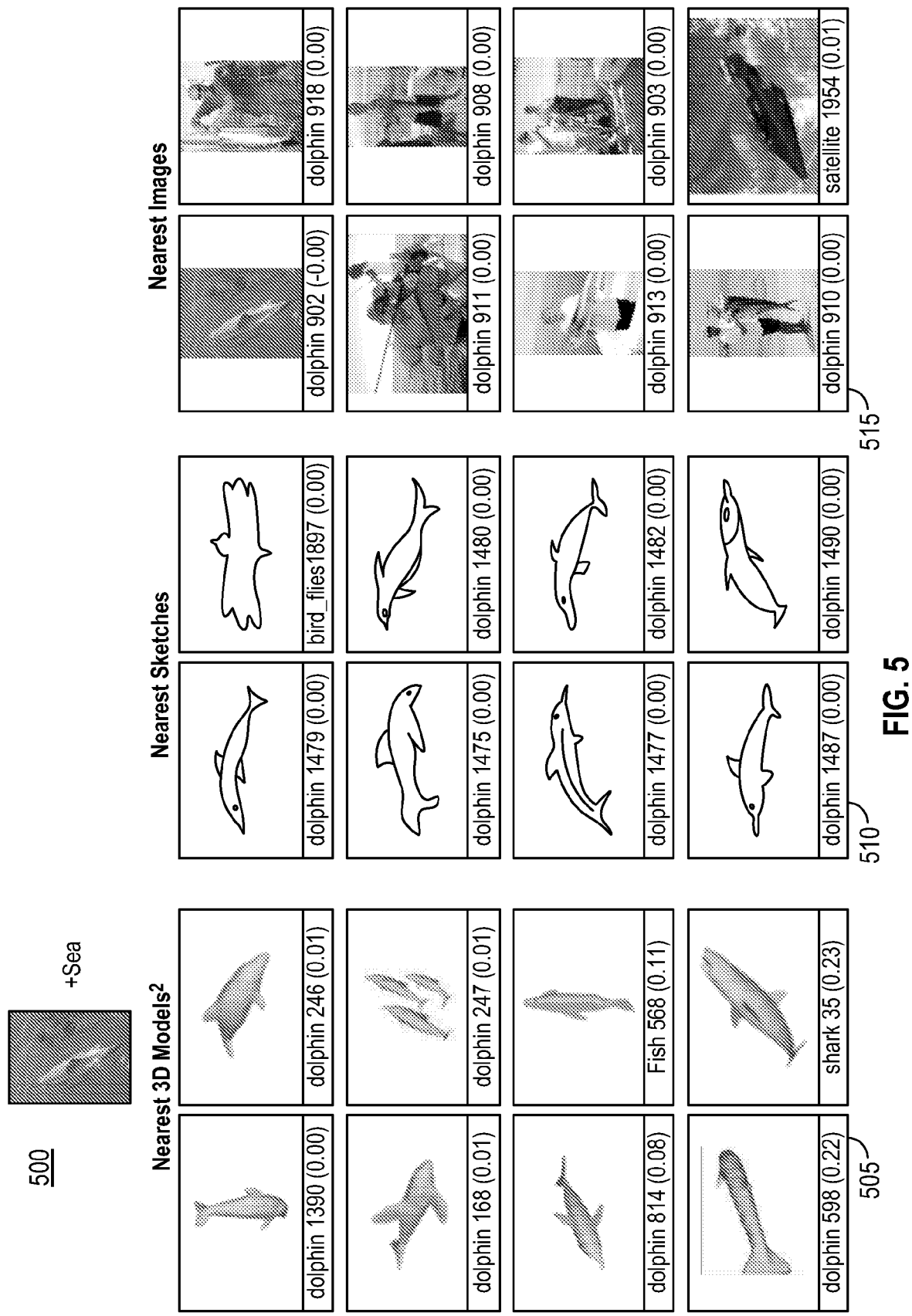
FIG. 5 illustrates an example of a multimodal query comprising an image and a tag, and the corresponding results retrieved comprising databases of 3D models, sketches and images.

FIG. 5 illustrates an example of a multimodal query 500 comprising an image and a tag, and the corresponding results retrieved comprising databases of 3D models 505, sketches 510 and images 515.

Figure 6:
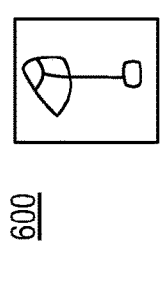
FIG. 6 illustrates an example of a multimodal query comprising a hand-drawn sketch and a tag, and the corresponding results retrieved comprising databases of 3D models, sketches and images.
Figure 7:
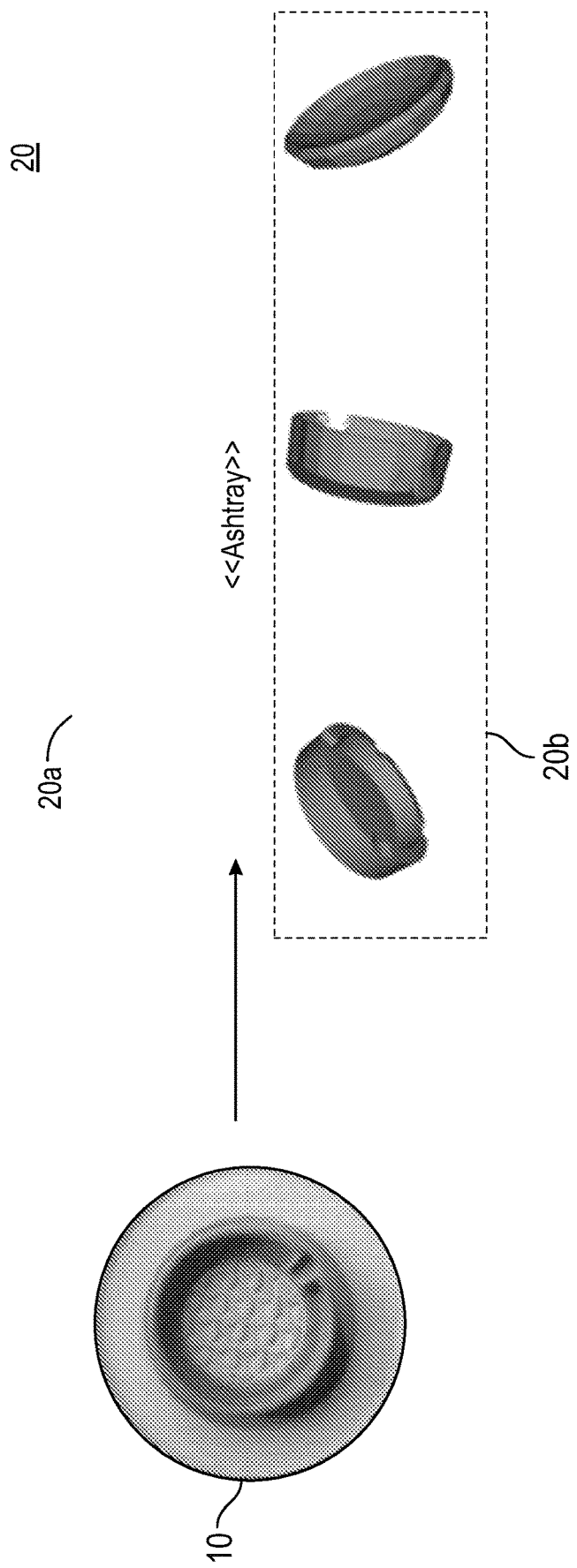
FIG. 7 illustrates a further example of a multi-modal query comprising one image and one tag, and the corresponding 3D models retrieved.

This method can be easily extended to a new modality such as depth images and sketches by training an encoder for mapping the modality to W. An example of a multi-modal query 600 comprising a sketch and tag is shown in FIG. 6. There is also shown the corresponding results retrieved comprising databases of 3D models in an upright orientation 605, databases of 3D models in an arbitrary orientation 610, sketches 615 and images 620.

Any system feature as described herein may also be provided as a method feature, and vice versa. As used herein, means plus function features may be expressed alternatively in terms of their corresponding structure.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects can be implemented and/or supplied and/or used independently.

The invention claimed is:

1. A method for combining image data, one or more 3D shapes, and tag data into a unified representation, comprising the steps of:
    determining a vector representation for the image data, the vector representation for the image data found within in a fixed vector space of words;
    determining a vector representation for the one or more 3D shapes, the vector representation for the one or more 3D shapes found within the vector space of words, by:
        computing rendered views for each of the one or more 3D shapes from multiple viewpoints,
        computing a descriptor for each view, and
        averaging the descriptors for each view by computing a weighted average from the rendered views, the weight of each rendered view determined by a proportion of information of the 3D shape captured by the rendered view;
    determining a vector representation for the tag data, the vector representation for the tag data found within the vector space of words; and
    combining the vector representations into a unified representation by:
        embedding the vector representation for the image data, the one or more 3D shapes, and the vector representation for the tag data into the vector space of words, and
        determining linear combinations of the vector representations within the vector space of words to compute the unified representation, wherein image data and tag data are weighted to specify their respective influence.

2. The method of claim 1, wherein semantically close words are mapped to spatially close vectors in the vector space of words.

3. The method of claim 1, further comprising performing the step of determining a vector representation for the image data using a neural network, optionally a convolutional neural network.

4. The method of claim 3, further comprising generating the neural network by an image classifier followed by an image encoder operable to generate embeddings in the vector space of words.

5. The method of claim 4, wherein the classifier is operable to be trained to identify image labels.

6. The method of claim 4, further comprising converting the image classifier to an encoder operable to generate semantic-based descriptors.

7. The method of claim 3, wherein the neural network comprises one or more fully-connected layers.

8. The method of claim 7, wherein the one or more fully-connected layers are operable to return a vector of a same dimensionality of the image data.

9. The method of claim 7, wherein one or more parameters of the one or more fully-connected layers are updated to minimize a total Euclidean loss.

10. The method of claim 9, further comprising calculating the total Euclidean loss through consideration of a smallest Euclidean difference between two points.

11. The method of claim 3, wherein the neural network is operable to minimize a softmax loss.

12. The method of claim 1, further comprising:
    calculating, in advance of a query being received and/or processed, one or more descriptors;
    receiving a query regarding the image data and/or the tag data; and
    providing a unified representation in relation to the query.

13. The method of claim 12, wherein:
    the image data comprises one or more embedded images;
    the one or more descriptors are calculated in relation to each of the one or more embedded images; and
    a shape descriptor is calculated according to an average of the one or more descriptors in relation to each of the one or more embedded images, optionally wherein the average is biased according to one or more of the weights.

14. A method of searching a collection of objects based on visual and semantic similarity of unified representations of the collection of objects, comprising the steps of:
    determining a unified descriptor for a search query, where the search query comprises both image, 3D shape, or object data and word or tag data; and
    determining one or more objects in the collection of objects having a spatially close vector representation to the unified descriptor for the search query,
    wherein a descriptor of a 3D shape is computed by:
        rendering views for each of the one or more 3D shapes from multiple viewpoints,
        computing a descriptor for each view, and
        averaging the descriptors for each view by computing a weighted average from the rendered views, the weight of each rendered view determined by a proportion of information of the 3D shape captured by the rendered view, and
    wherein the unified descriptor is computed by determining linear combinations of the descriptors within a fixed vector space of words, and the image, 3D shape, or object data and word or tag data are weighted to specify their respective influence.

15. A method for searching for an image or shape based on a query comprising text and images, comprising the steps of:
    creating a fixed vector space of words in which the images, three dimensional objects, text and combinations of the same are embedded;
    determining vector representations for each of the images, three dimensional objects, text and combinations thereof;
    combining the vector representations into a unified representation by:
        embedding the vector representation for the images, the three dimensional objects, and the vector representation for the text into the vector space of words, and
        determining linear combinations of the vector representations within the vector space of words to compute the unified representation, wherein images and text are weighted to specify their respective influence;
    determining a vector representation for the query; and
    determining, from the unified representation, which one or more of the images, three dimensional objects, the text and combinations have a spatially close vector representation to the vector representation for the query,
    wherein the vector representations of the three dimensional objects are computed by:
        rendering views for each of the three dimensional objects from multiple viewpoints,
        computing a descriptor for each view, and
        averaging the descriptors for each view by computing a weighted average from the rendered views, the weight of each rendered view determined by a proportion of information of the three dimensional objects captured by the rendered view.

16. The method of claim 15, further comprising the step of replacing objects in an image with contextually similar objects.

\* \* \* \* \*